March 30, 1937. L. S. ADAMS 2,075,690
ARTICLE DEPOSIT AND PICK-UP APPARATUS FOR AIRPLANES
Original Filed Aug. 19, 1935
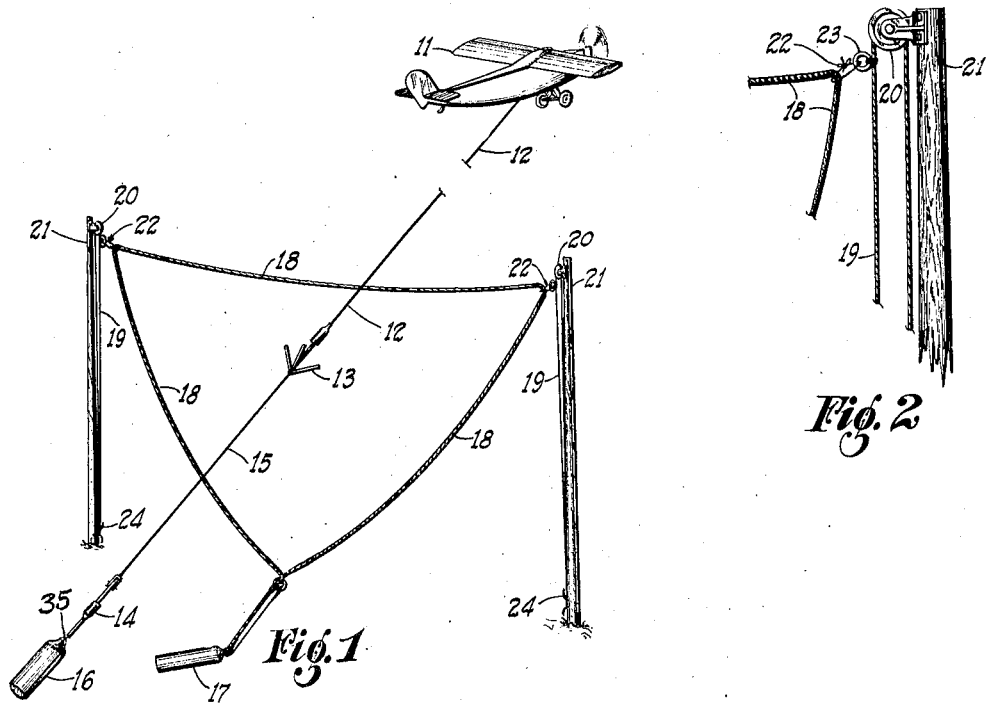
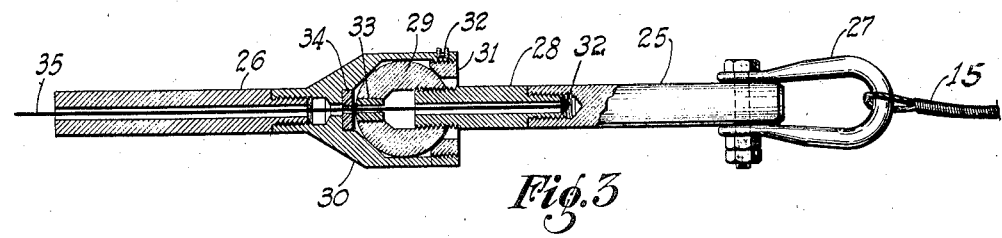
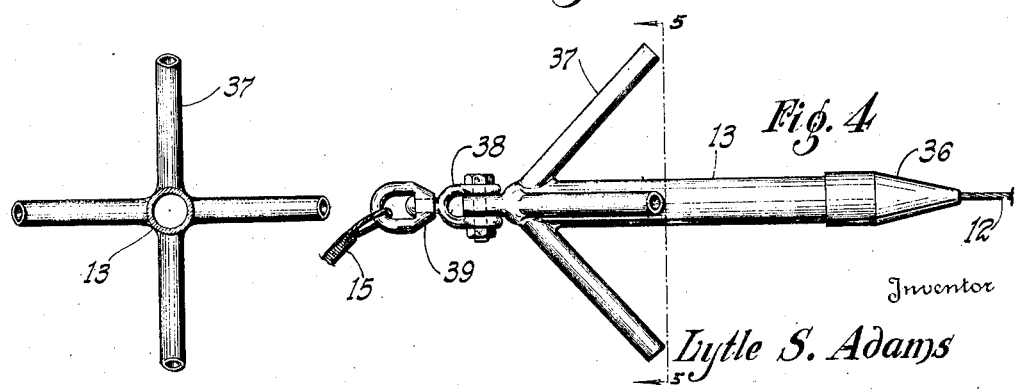
Inventor
Lytle S. Adams Patented Mar. 30, 1937

2,075,690

UNITED STATES PATENT OFFICE 2,075,690

ARTICLE DEPOSIT AND PICK-UP APPARATUS FOR AIRPLANES

Lytle S. Adams, Irwin, Pa., assignor of one-half to Arthur Patterson Davis, Brooklyn, N. Y.

Application August 19, 1935, Serial No. 36,891
Renewed February 8, 1937

12 Claims. (Cl. 258—1)

This invention relates to devices for enabling airplanes to deliver and receive articles while flying above the ground without landing, and aims to simplify and improve such devices.

The invention is adapted to rough country where landing is difficult or impossible, and one of its objects is to provide means for accomplishing its purpose which may readily be transported from place to place by pack animals and by man power.

Further objects and advantages of the invention appear in connection with the following description of a preferred form of apparatus, illustrated in the accompanying drawing, wherein Fig. 1 is a schematic elevational view of the apparatus showing a plane about to drop one load and pick up another;

Fig. 2 is a detail view of a part of the loop supporting structure, drawn to a larger scale than Fig. 1;

Fig. 3 is a part sectional and part side view of the cable cutting device;

Fig. 4 is a side view of the grapple; and

Fig. 5 is a cross-section of the grapple on the line 5—5 in Fig. 4, Figs. 3, 4 and 5 being to a larger scale than Fig. 2.

Referring to Fig. 1 of the drawing, the airplane 11 is shown as provided with a trailing cable 12 to the lower end of which is attached a grapple 13 and a contact cable cutter 14 for severing the end section 15 of the cable between the grapple and container 16 which is to be dropped.

The container 17 which is to be picked up is attached to a loop 18, the bight of which is spread in the path of the grapple 13 as it is dragged along above the ground behind the plane flying overhead. The loop is held in spread position with its middle third parallel to and spaced some ten to fifteen feet above the ground by means of cords 19 arranged over the pulleys 20 placed at the tops of the light poles 21 which are spaced about twenty feet apart across the path of flight of the airplane. Breakable ties or light cords 22 may be used to secure the bight of the loop 18 to the rings 23 on the cords 19 for positioning them until picked up by the grapple, when these ties are broken by the jerk on the loop and free the latter from the cords 19. Suitable fastenings, such as cleats 24, are provided on the posts at a convenient height from the ground for securing the ends of the cords after raising the bight of the loop into position for engagement by the grapple.

The cable cutting device 15, shown in detail in Fig. 3, comprises two main parts, the stem 25 and the cutter arm 26. At one end of the stem is a swivel or eye 27 for attachment to the cable 15, and the other end is provided with a screw socket to receive a tubular cutter support 28 which screws into it and carries a ball shape cutter holder 29 on its extremity. This ball shape member 29 serves as one member of a universal joint, the other member being a suitable hollow head 30 on the cutter arm 26. A retaining ring 31, which screws into the open end of the hollow head 30 and has a seat portion bearing against the ball 29, holds the stem and arm together, while permitting relative angular movement of one with respect to the other in all directions.

The annular cutters 33, 34, are respectively mounted in the ball 29 and head 30 in axial alinement, and the short cable section 35 which connects the cable section 15 and container 16 passes through the orifices in the cutter and its inner or fixed end is enlarged or provided with a washer 32 for retaining it in the stem. The cable 35 is preferably made of copper or other soft, ductile material, and its outer or free end is secured to the container 16 in any suitable manner.

The construction of the cutter stem and arm, which respectively carry the two cutter knives 33, 34, is such that upon striking the ground or other object, the arm 26 is twisted sideways and severs the cable 35 passing through the cutters. The cutter knives are annular so as to operate in any direction.

The grapple device 13, consists of a stem connected at one end to the cable section 12 by a thimble 36, and having four arms 37 at its other end. A swivel member 38 having an eye 39 furnishes means for connecting the cable section 15 to the trailing end of the grapple.

The operation of the apparatus to drop a load is simple. The two parts of the stem 25 are unscrewed, and the short cable 35 is run through the tubular member 28, cutters 33, 34, and out the open end of the cutter arm 26 until the washer or head 32 on the end of the cable is seated on the end of the member 28, whereupon the latter is screwed into the stem 25 so as to prevent it from being withdrawn. The load 16 is thereupon attached to the free end of the cable 35, and the load and supporting cable lowered and trailed from the plane. The cable cutter operates upon the load striking the ground, which puts a sudden lateral jerk on the cutter arm 26 such as to swing the latter with respect to the ball 29 enough to sever the cable 35 and drop the container 16 and its load.

The containers 16, 17, preferably are made of canvas or other suitable material, impregnated with rubber to make them water-tight and resilient. Their side walls should be stiff enough to prevent collapsing, and they may be lined with sponge rubber, corrugated board, or other material for absorbing shock. The connection between the container 17 and the loop 18 may advantageously be provided with a short length of rubber shock cord to cushion the shock on the cable 12 at the moment of picking up the load.

The simultaneous dropping of one load and picking up of another by the same cable may be accomplished by careful maneuvering of the plane so as to pick up the loop 18 at just about the time the cable cutter 14 strikes the ground, preferably while the cable is held taut by the weight of the container 16, although this is not essential.

My apparatus is well adapted for delivering supplies to mountain climbers or to a landing party on a hostile coast or other place where no ground apparatus is available, as it is only necessary to have a long enough open stretch to permit the plane to come close enough to the snow or ground to permit the container 16 or the arm 26 to strike and the cutting member 14 will operate to release the load immediately, permitting the plane to rise, turn or otherwise maneuver to avoid surrounding obstacles. For these purposes, the grapple 13 is omitted from the trailing cable 12.

Another use to which my invention is adapted is the delivery and picking up of mail and newspapers on either temporary or permanent routes upon which it is desired to maintain a regular service. For this purpose the poles and loop holding equipment are set up wherever service is to be maintained, and as this equipment is light and easily transported and operated, a single ground attendant is all that is necessary.

The apparatus may be used for dropping loads without picking up other loads, for picking up loads without dropping other loads, and for dropping and picking up loads, as desired, and is not restricted to the detail construction illustrated.

I claim the following as my invention:

1. Airplane article delivery apparatus of the type having a trailing cable for dropping the load, comprising a contact device secured to the lower end of the cable, a flexible connector secured at one end to said contact device and carrying the load at its other end, and means on said contact device for severing said flexible connector upon striking the ground.

2. Airplane article delivery apparatus of the type having a trailing cable for dropping the load, comprising a contact device secured to the lower end of the cable, a flexible connector secured at one end to said contact device and carrying the load at its other end, and means on said contact device for severing said flexible connector upon striking the ground, said severing means including a pair of knife carrying members pivotally connected adjacent the meeting plane of the knives and normally held in non-cutting position by said flexible connector.

3. In an article delivery apparatus for airplanes and the like, a trailing cable and means for severing the same comprising two alined members pivotally connected at their adjacent ends, a pair of cutting elements secured one to each of said members adjacent to the pivot point, and means for holding said cable with respect to said cutting elements in position to be cut by relative pivotal movement of said members.

4. In an article delivery apparatus for airplanes and the like, a trailing cable and means for severing the same comprising two alined members pivotally connected at their adjacent ends, a pair of annular cutting elements secured one to each of said members adjacent to the pivot point, said cable passing through the openings in said cutting elements, and means for holding said cable and cutting elements in alinement until displaced by contact with the ground.

5. A cable holding and cutting device comprising articulated members having axial bores normally in longitudinal alinement adapted to receive a cable, means for attaching said cable to one of said members, an annular cutter carried by each of said members in juxtaposition, said cutters being disposed in alinement with the bores in said members and spaced from the pivot point thereof, whereby relative pivotal movement of said members causes said cutters to sever a cable passing through them.

6. A cable holding and cutting device comprising articulated members having axial bores normally in longitudinal alinement adapted to receive a cable, means for attaching said cable to one of said members, a cutter carried by each of said members in juxtaposition, the cutting edges of said cutters being disposed in alinement with the bores in said members and spaced from the pivot point thereof, whereby relative pivotal movement of said members causes said cutters to sever a cable passing through them.

7. A cable holding and cutting device comprising a socket member and a ball member having tubular bores normally in endwise alinement to permit a cable to run through them, means on one of said members for securing the cable against endwise movement through said members, and annular knives carried by said members, said knives being secured at the adjacent ends of said bores with their openings in alinement therewith respectively.

8. A cable holding and cutting device comprising a socket member and a ball member having tubular bores normally in endwise alinement to permit a cable to run through them, means on one of said members for securing the cable against endwise movement through said members, annular knives carried by said members, said knives being secured at the adjacent ends of said bores with their openings in alinement therewith respectively, and a second cable securing means on said cable securing means carrying member.

9. A cable holding and cutting device comprising a socket member and a ball member having tubular bores normally in endwise alinement to permit a cable to run through them, means on one of said members for securing the cable against endwise movement through said members, said member having a swiveled end provided with a second cable securing means, annular knives carried by said members, said knives being secured at the adjacent ends of said bores with their openings in alinement therewith respectively, the pull on said cables serving to hold said members in alinement to prevent cutting action of said knives.

10. Airplane article pick up and delivery apparatus comprising spaced ground supports, a load-supporting loop detachably held thereby, and a trailing cable adapted to be suspended from an airplane, said cable having a grapple thereon for picking up said loop, a severing means operable by the trailing end of the cable, and a detachable load supporting terminal section adapted to be severed upon contact of the trailing end with the ground, all assembled in series on said cable.

11. Airplane article pick up and delivery apparatus comprising a trailing cable adapted to be suspended from an airplane, said cable having a grapple thereon for picking up a load and a detachable load supporting terminal section adapted to be severed upon contact of the trailing end with the ground, said terminal section having means of attachment to the cable including a ball and socket joint provided with alining axial bores through which the cable passes, and knives carried by the sections of said joint and normally out of cutting engagement with the cable.

12. An airplane article pick up and delivery apparatus of the character described, comprising a trailing cable provided with a grapple near its trailing end, cable severing means carried thereby positioned between the grapple and end of the cable, means for actuating said cable severing means actuated upon contact with the ground, and means at the end of the cable for attaching a load to be delivered, substantially as described and for the purposes named.

LYTLE S. ADAMS.